(12) United States Patent
Umemoto

(10) Patent No.: US 6,820,403 B2
(45) Date of Patent: Nov. 23, 2004

(54) LAWN MOWER REAR DRIVE

(75) Inventor: Hideya Umemoto, Sakai (JP)

(73) Assignee: Kubota Corporation, Osaka (JP)

(*) Notice: Subject to any disclaimer, the term of this patent is extended or adjusted under 35 U.S.C. 154(b) by 0 days.

(21) Appl. No.: 10/227,703

(22) Filed: Aug. 26, 2002

(65) Prior Publication Data
US 2003/0097828 A1 May 29, 2003

(30) Foreign Application Priority Data
Nov. 27, 2001 (JP) ........................................ 2001-360925

(51) Int. Cl.⁷ .............................................. A01D 69/00
(52) U.S. Cl. ........................................ 56/10.8; 180/291
(58) Field of Search ............................... 56/10.8, 11.1, 56/11.2, 11.4, 202, 16.6, 203; 180/291, 308, 54.1, 6.2, 6.3, 6.32, 395, 292, 307, 68.6, 68.4, 908

(56) References Cited

U.S. PATENT DOCUMENTS

| 3,612,199 | A | * | 10/1971 | Vissers ...................... 180/6.32 |
| 3,969,876 | A | | 7/1976 | Turos |
| 4,738,328 | A | | 4/1988 | Hayden |
| 4,809,796 | A | | 3/1989 | Yamaoka et al. |
| 4,916,887 | A | | 4/1990 | Mullet et al. |
| 5,078,222 | A | | 1/1992 | Hauser et al. |
| 5,816,034 | A | | 10/1998 | Peter |
| 6,056,074 | A | * | 5/2000 | Heal et al. .................. 180/6.48 |
| 6,185,920 | B1 | | 2/2001 | Oxley |
| 6,196,348 | B1 | | 3/2001 | Yano et al. |
| 6,360,517 | B1 | | 3/2002 | Ishimori et al. |
| 6,434,917 | B1 | * | 8/2002 | Bartel ......................... 56/11.3 |
| 6,484,486 | B2 | * | 11/2002 | Nagai et al. .................. 56/16.8 |
| 6,578,656 | B2 | * | 6/2003 | Samejima et al. .......... 180/291 |

FOREIGN PATENT DOCUMENTS

| EP | 0532068 | * | 3/1993 | .......... A01D/34/70 |
| FR | 2722641 A1 | | 1/1996 | |
| FR | 2797375 A | | 2/2001 | |
| JP | 20000071790 A | | 3/2000 | |
| JP | 20000270652 A | | 10/2000 | |
| JP | 2001045826 A | | 2/2001 | |
| JP | 2000-238324 A | | 8/2002 | |
| WO | WO 01 33939 A | | 5/2001 | |

* cited by examiner

Primary Examiner—Árpád Fábián Kovács
(74) Attorney, Agent, or Firm—Webb Ziesenheim Logsdon Orkin & Hanson, P.C.

(57) ABSTRACT

A lawn mower includes front wheels (2), a pair of right and left rear drive wheels (3), a body frame (1), a mower unit (4) supported by the body frame (1) forwardly of the rear drive wheels (3), a grass catcher 32 attached to a rear end of the body frame (1), an engine (7) mounted on the body frame (1), a left change speed device for changing speed of drive from the engine (7), and transmitting the drive to a left axle (3a) of the left rear wheel, a right change speed device for changing speed of drive from the engine (7), and transmitting the drive to a right axle (3a) of the right rear wheel, and a grass collecting duct 31 connected at one end thereof to the mower unit and at the other end to the grass catcher 32. The left change speed device (15, 17) is disposed in a left region of the body frame to extend upward from the left axle (3a). The right change speed device (15, 17) is disposed in a right region of the body frame to extend upward from the left axle (3a). The left change speed device and the right change speed device defining a space (33) opening downward, and the grass collecting duct extends through the space.

7 Claims, 4 Drawing Sheets

LAWN MOWER REAR DRIVE

BACKGROUND OF THE INVENTION

1. Field of the Invention

This invention relates to a lawn mower having front wheels, a pair of right and left rear drive wheels, a body frame, a mower unit supported by the body frame forwardly of the rear drive wheels, a grass catcher attached to the rear of the body frame, an engine mounted on the body frame, a left change speed device for changing speed of drive from the engine, and transmitting it to a left axle of the left rear wheel, a right change speed device for changing speed of drive from the engine, and transmitting it to a right axle of the right rear wheel, and a grass collecting duct connected at one end thereof to the mower unit and the other end to the grass catcher.

2. Description of the Related Art

It is the most desirable to pass the grass collecting duct through a space between the rear wheels. Since the rear axles are obstructive, the above-noted lawn mower has the grass collecting duct extending through a laterally outward area of the vehicle body. However, the grass collecting duct protruding laterally of the vehicle body increases the width of the vehicle body, and impairs operability of the vehicle body. To eliminate these drawbacks, as disclosed in Japanese Patent Publication (Unexamined) 2001-45826 (corresponding to U.S. Pat. No. 6,360,517 B1), for example, a proposal has been made to arrange a change speed device including an HST (hydrostatic stepless transmission) and gear type change speed mechanisms, and a grass collecting duct, in a space produced by lowering the rear axles.

However, according to the above prior art, the vehicle body has a bad right and left balance since the heavy change speed device and light grass collecting duct are juxtaposed right and left in the space formed in a transversely middle region of the vehicle body. Further, the grass collecting duct disposed to one side results in an inconvenience of grass clippings accumulating in the side of the grass catcher connected to the grass collecting duct.

Moreover, the lowered rear axles have a reduced height over the ground. This increases the possibility of the rear axles colliding with obstacles on the ground, and renders the lawn mower unsuitable for running over a rough ground.

SUMMARY OF THE INVENTION

The object of this invention is to provide a lawn mower having a grass collecting duct extending through a space between rear wheels to realize improved right and left balance of a vehicle body and sideways compactness of the vehicle body, with rear axles having a sufficient height over the ground.

The above object is fulfilled, according to this invention, by a lawn mower comprising, front wheels, a pair of right and left rear drive wheels, a body frame, a mower unit supported by the body frame forwardly of the rear drive wheels, a grass catcher attached to a rear end of the body frame, an engine mounted on the body frame, a left change speed device for changing speed of drive from the engine, and transmitting the drive to a left side of the left rear wheel, a right change speed device for changing speed of drive from the engine, and transmitting the drive to a right axle of the right rear wheel, and a grass collecting duct connected at one end thereof to the mower unit and at the other end to the grass catcher, wherein the left change speed device is disposed in a left region of the body frame to extend upward from the left axle, and the right change speed device is disposed in a right region of the body frame to extend upward from the left axle, the left change speed device and the right change speed device defining a space opening downward, the grass collecting duct extending through the space.

In this construction, the two change speed devices are arranged in the right and left side regions of the vehicle body, respectively, with the grass collecting duct extending through the space formed between the change speed devices. This arrangement improves the right and left balance of the vehicle body. Since drive is transmitted from the right and left change speed devices directly to the axles of the rear wheels, the axles have a sufficient height over the ground, with no axles interconnecting the right and left rear wheels.

Where drive from the engine is transmitted independently to the respective drive wheels through the right and left change speed devices, the right and left change speed devices may be shifted independently of each other to produce a straight running state in which the right and left drive wheels are driven at equal speed, a large turning state in which the right and left drive wheels are driven at different speeds in the same direction, a pivot turning state in which one of the right and left drive wheels is stopped, and a spin turning state in which the right and left drive wheels are driven in opposite directions. Each of these states may easily be selected according to working conditions.

In a preferred embodiment of this invention, each of the right and left change speed devices includes a stepless transmission such as an HST and a reduction mechanism such as a gear type change speed mechanism, the stepless transmission being disposed level with the rear wheel, the reduction mechanism extending vertically from the stepless transmission to the axle. The stepless transmissions that are structurally difficult to form into a thin configuration are arranged in an upper region. The reduction mechanisms that are easy to form into a thin configuration are arranged along side surfaces of the rear wheels. Thus, the space defined between the reduction mechanisms has an increased right and left width.

In a preferred embodiment for secure a satisfactory size of the above space, the body frame is formed of a pair of right and left band-like profile members extending fore and aft, the stepless transmissions being disposed above the band-like profile members, the reduction mechanisms being disposed outwardly of the band-like profile members.

In a further another embodiment, each reduction mechanism is fixed to an outer surface of the corresponding one of the band-like profile members. With this construction, all the area below the right and left band-like profile members may be used as the space for accommodating the grass collecting duct. For this purpose, it is important for the engine to be disposed level with or in a higher position than the stepless transmissions. Further, it is important that a drive distributing mechanism is disposed between and level with the right and left stepless transmissions for distributing drive from the engine to the right and left stepless transmissions.

To secure a good balance of the vehicle body, in a further embodiment, the grass collecting duct extends such that the center of a duct section substantially corresponds to the axles of said rear wheels.

Other features and advantages of this invention will be apparent from the following description of the embodiment to be taken with reference to the drawings.

DESCRIPTION OF THE PREFERRED EMBODIMENT

Figure 1:
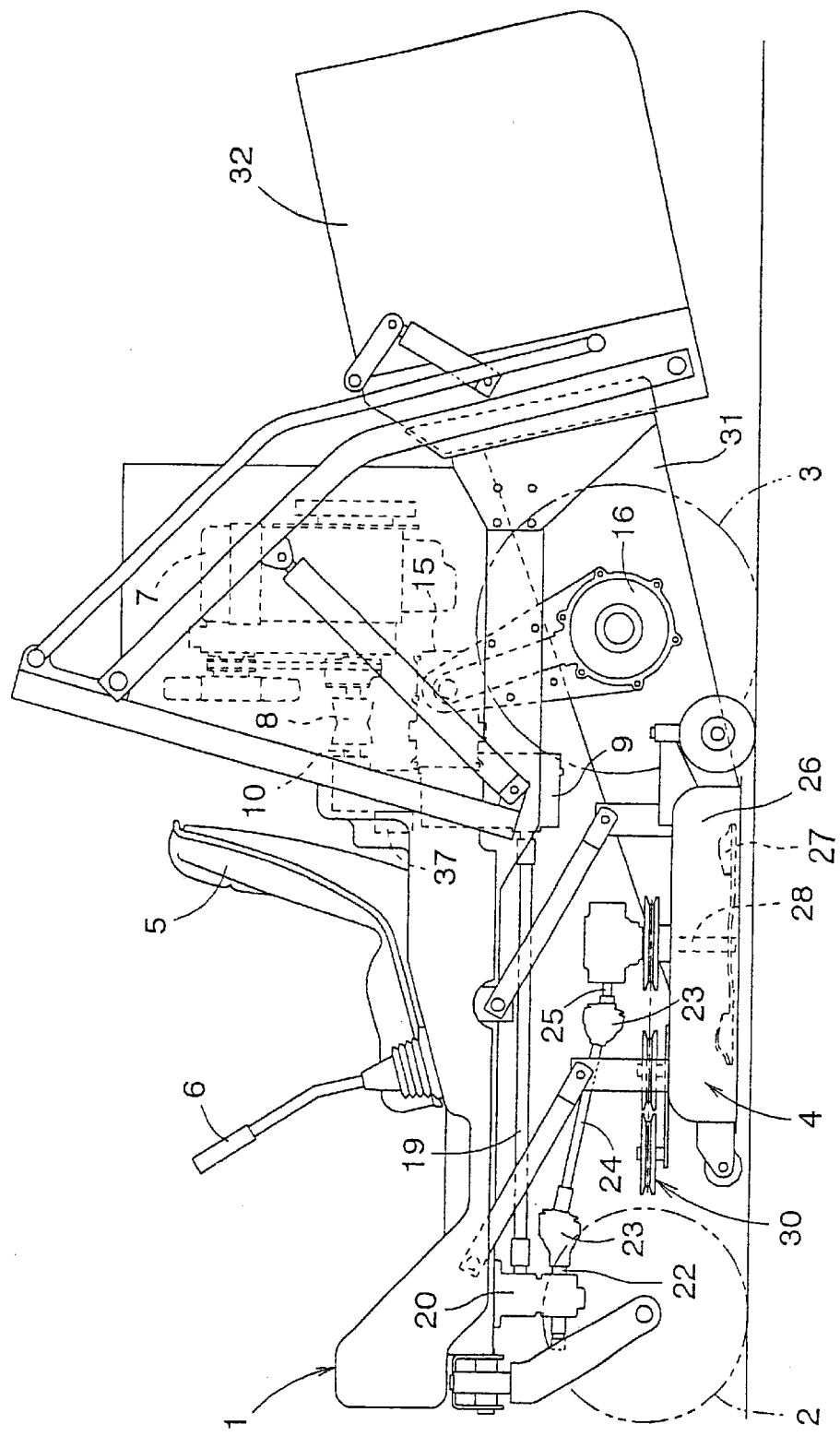
FIG. 1 is a side elevation of a lawn mower shown in this invention.

FIG. 1 shows a side elevation of a lawn mower having a pair of right and left caster type wheels 2 acting as front wheels disposed at the front of a body frame 1 and a pair of right and left drive wheels 3 acting as rear wheels disposed at the rear of body frame 1. This lawn mower is the mid-mount type with a mower unit 4 vertically movably supported by the body frame 1 between the front wheels 2 and rear wheels 3.

The lawn mower may be the front-mount type having the mower unit 4 connected to the front of body frame 1.

The body frame 1 is formed basically of a pair of right and left band-like profile members extending in the fore and aft direction.

As shown in FIGS. 1 through 4, the body frame 1 has a driver's seat 5 disposed over the mower unit 4, and shift levers 6 at the right and left sides of the driver's seat 5. An engine 7 is mounted on the body frame 1 rearwardly of the driver's seat 5. Drive is transmitted from the engine 7 through a ball joint 8 that allows displacements of a transmission axis due to vibration, to an input shaft 10 of a transmission case 9 disposed below and forwardly of the engine 7. In the transmission case 9 drive is transmitted from the input shaft 10 through three spur gears 11 to a drive distributing mechanism 12. From this drive distributing mechanism 12 propelling drive is transmitted through a pair of bevel gears 13 and a transversely extending relay shaft 14 to right and left HSTs hydrostatic stepless transmissions) 15. Drive having undergone a change speed operation by each of the right and left HSTs 15 is transmitted to an axle 3a of the corresponding drive wheel 3 through a reduction mechanism 17 mounted in a right or left axle case 16. Thus, each of right and left change speed devices is formed of the stepless transmission 15 and reduction mechanism 17.

Drive from the engine 7 is transmitted independently to the axles 3a of right and left drive wheels (rear wheels) 3 through the corresponding right and left HSTs 15. The right and left shift levers 6 are linked to the right and left HSTs 15, respectively, and are operable to shift the right and left HSTs 15 independently of each other. The lawn mower is switchable between a straight running state with the right and left HSTs 15 providing the same speed to rotate the right and left drive wheels 3 at equal speed, and a turning state with the right and left HSTs 15 providing different speeds to rotate the right and left drive wheels 3 at different speeds. Since HSTs 15 are switchable between forward drive and backward drive, the turning state includes a large turning state produced when the right and left drive wheels 3 are driven at different speeds in the same direction, a pivot turning state produced when one of the right and left drive wheels 3 is stopped, and a spin turning state produced when the right and left drive wheels 3 are driven in opposite directions.

Figure 2:
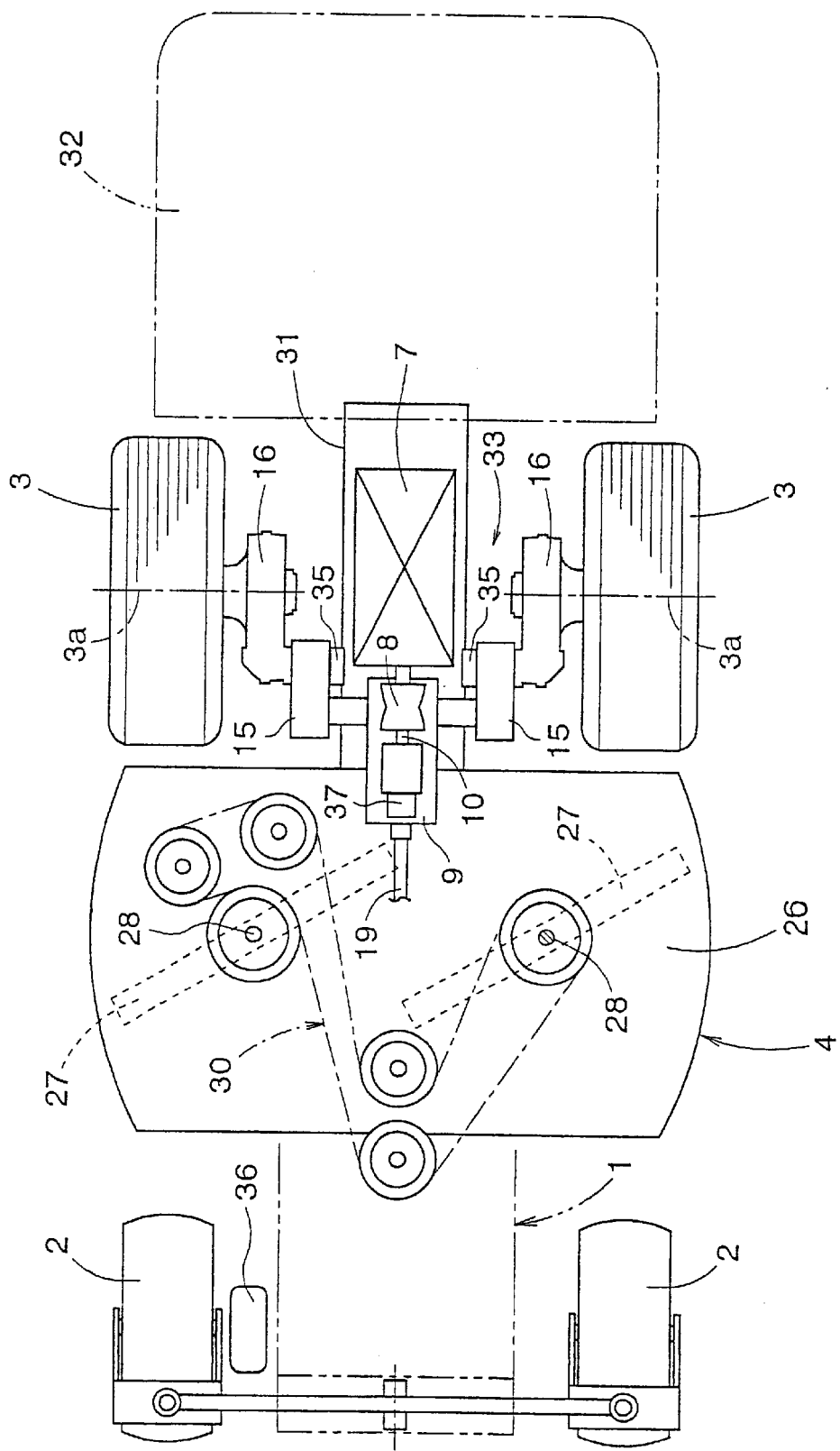
FIG. 2 is a plan view of a principal portion of the lawn mower shown in FIG. 1.
Figure 4:
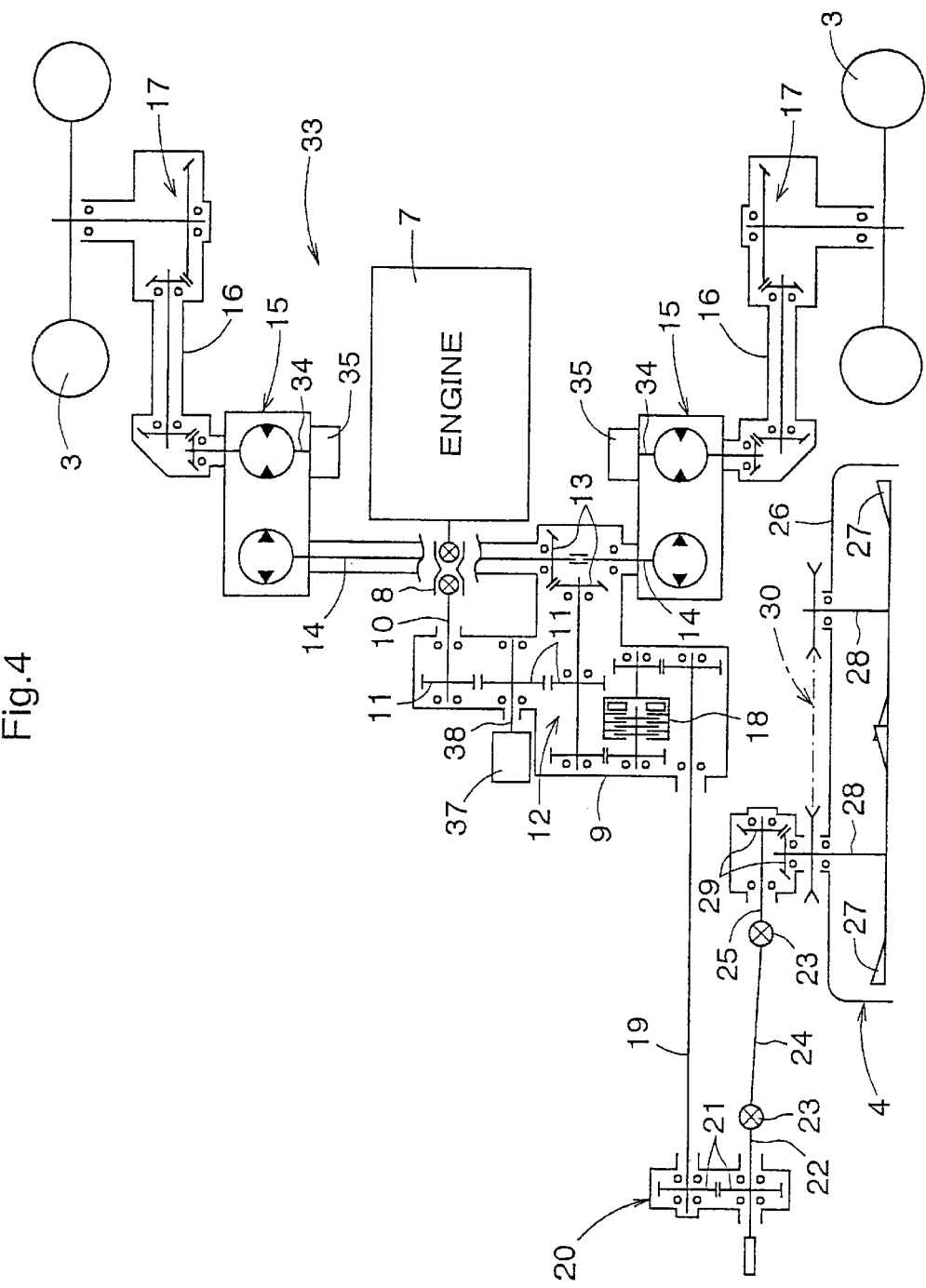
FIG. 4 is a schematic view of a transmission system of the lawn mower shown in FIG. 1.

As shown in FIGS. 1, 2 and 4, the drive distributing mechanism 12 includes a multi-disk type working clutch 18 for transmitting and breaking working power. The working power emerging from the working clutch 18 is transmitted through a first transmission shaft 19 extending fore and aft and a pair of spur gears 21 mounted in a front case 20 at the front of the vehicle body 1 to a power takeoff shaft 22. From the rear end of this power takeoff shaft 22 power is transmitted through a pair of ball joints 23 and a second transmission shaft 24 extending fore and aft to an input shaft 25 of mower unit 4.

Power may be taken also from the forward end of the power takeoff shaft 22. By using the forward end of this power takeoff shaft 22, though not shown in the drawings, power may be transmitted easily to an auxiliary working implement attached to the front of the body frame 1. Where, for example, the auxiliary working implement is an auxiliary mower unit having a smaller cutting width than the mower unit 4, the auxiliary mower unit may enter a narrow space between trees which is inaccessible to the mower unit 4. Thus, grass may easily cut in such narrow locations. Where such an auxiliary mower unit is positioned laterally of the mower unit 4 to increase the cutting width, a grass cutting operation over a large working area may be carried out with improved efficiency.

The mower unit 4 has a housing 26 containing a pair of right and left grass cutting blades 27 rotatable about vertical support shafts 28. The working power transmitted to the input shaft 25 is transmitted to one of the support shafts 28 through a pair of bevel gears 29, and then transmitted from this support shaft 28 to the other support shaft 28 through a belt transmission mechanism 30. The right and left blades 27 are thereby driven to rotate in opposite directions at the same speed, with rotating tracks partly overlapping each other, and the blades moving backward in the overlapping locations. The rotating blades 27 cut grass and generate carrier air flows. The air flows entrain and transport grass clippings rearward through a discharge opening, not shown, formed in a transversely middle position of a rear wall of the housing 26.

As shown in FIGS. 1 and 2, the grass clippings discharged from the discharge opening of the housing 26 are guided by a grass collecting duct 31 connected to the discharge opening, to enter a grass catcher 32 attached to the rear of the body frame 1.

As shown in FIGS. 1 through 4, the right and left HSTs 15 and reduction mechanisms 17 are arranged right and left symmetrical positions opposed to each other across the drive distributing mechanism 12 disposed in the middle position transversely of the body frame 1. Thus, the drive distributing mechanism 12, and right and left HSTs 15 and reduction mechanisms 17 constitute a gate-shaped structure defining a space 33 in a lower, transversely middle position. The right and left reduction mechanisms 17 are arranged outwardly of the corresponding HSTs 15. This arrangement secures the relatively large space 33. The grass collecting duct 31 is disposed to extend through a transversely middle position in the space 33.

Thus, the heavy right and left HSTs 15 and reduction mechanisms 17 are symmetrically arranged right and left, and the light, hollow grass collecting duct 31 is disposed to extend through the transversely middle position in the space 33 defined by the HSTs 15 and reduction mechanisms 17. The lawn mower has improved right and left balance, and grass clippings discharged from the mower unit 4 may collect in the grass catcher 32 in a balanced way. Moreover, with the right and left reduction mechanisms 17 arranged outwardly of the corresponding HSTs 15, the reduction mechanisms 17 effectively reduces the changes of damages of the relatively expensive HSTs 15 due to contact with other objects. The relatively large space 33 facilitates positioning of the grass collecting duct 31, and increases the distance between the right and left drive wheels 3 to improve the stability of the entire lawn mower.

Figure 3:
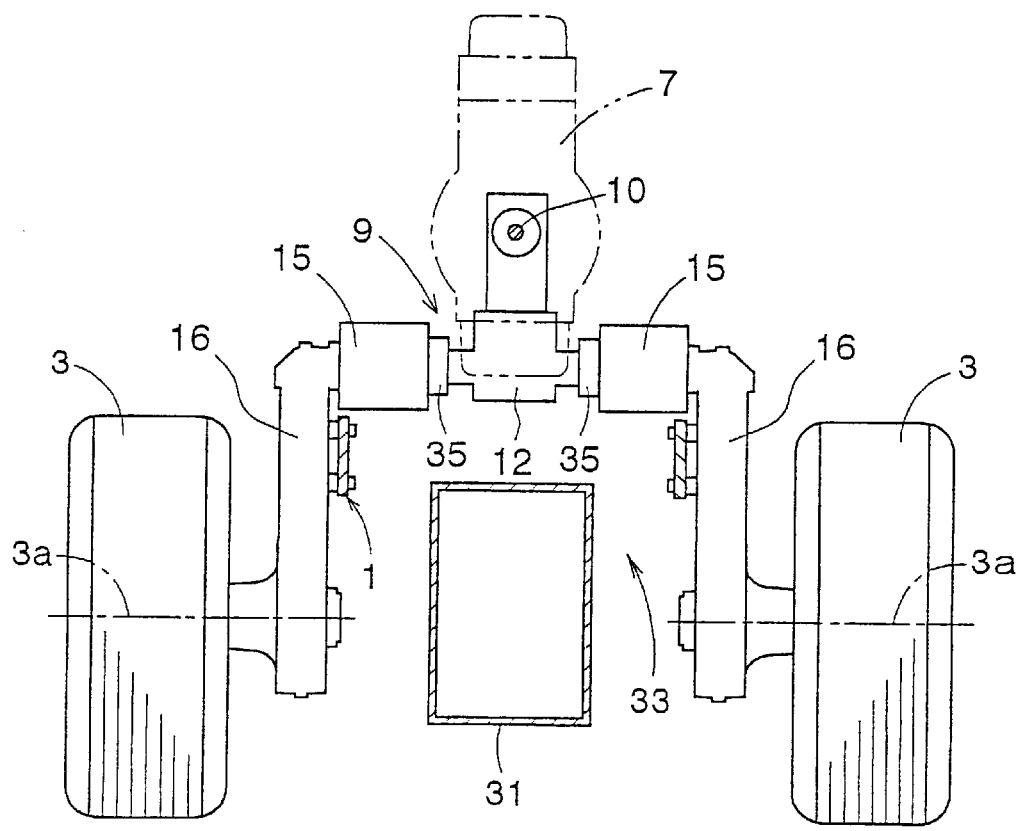
FIG. 3 is a rear view of a principal portion of the lawn mower shown in FIG. 1.

As seen from FIG. 3, the grass collecting duct 31 extends such that the center of a duct section substantially corresponding to the axles 3a of the rear wheels 3. Further, it may be confirmed from FIG. 3 that the drive distributing mechanism 12 is disposed between and at the same height as the right and left stepless transmissions 15.

As shown in FIGS. 2 through 4, wet type brakes 35 are disposed inwardly of the right and left HSTs 15 for braking output shafts 34 of the corresponding HSTs 15 to brake the corresponding drive wheels 3, respectively. These right and left wet type brakes 35 are linked to a single brake pedal 36 disposed in a right forward position of the body frame 1.

That is, the wet type brakes 35 arranged inwardly of the right and left HSTs 15 are effectively protected from damage due to contact with other objects. With the right and left wet type brakes 35 linked to the single brake pedal 36, a depression of the brake pedal 36 causes the right and left wet type brakes 35 to take braking action simultaneously, to brake the vehicle body without deflection.

Numeral 37 in FIG. 4 denotes a gear pump driven by rotation of an intermediate shaft 38 rotatable with the middle one of the three spur gears 11 arranged from the input shafts 10 of transmission case 9 to the drive distributing mechanism 12.

What is claim is:

1. A lawn mower comprising:

front wheels;

a pair of right and left rear drive wheels, said right rear drive wheel having a left lateral side and said left rear drive wheel having a right lateral side with respect to a transverse direction of the lawn mower;

a body frame;

a mower unit supported by said body frame forwardly of said rear drive wheels;

a grass catcher attached to a rear end of said body frame;

a grass collecting duct connected at one end thereof to said mower unit and at the other end to said grass catcher;

an engine mounted on said body frame;

a drive distributing case receiving drive from said engine, said drive distributing case housing a relay shaft, said relay shaft extending in the transverse direction of the lawn mower for distributing the drive from said engine to a right and left in the transverse direction;

a left change speed device, said left change speed device including a left HST case housing a left HST for changing speed of the drive distributed left from said relay shaft, and a left reduction case for reducing the drive from said left HST and transmitting the reduced drive to a left axle of said left rear wheel, said left HST case being disposed level with said left rear drive wheel and said relay shaft, and said left reduction case being disposed on a left lateral side of said left HST case in the transverse direction, and extending downwardly from said left HST case to said left axle along said right lateral side of said left rear drive wheel;

a right change speed device, said right change speed device including a right HST case housing a right HST for changing speed of the drive distributed right from said relay shaft, and a right reduction case for reducing the drive from said right HST and transmitting the reduced drive to a right axle of said right rear wheel, said right HST case being disposed level with said right rear drive wheel and said relay shaft, and said right reduction case being disposed on a right lateral side of said right HST case in the transverse direction, and extending downwardly from said right HST case to said right axle along said left lateral side of said right rear drive wheel;

wherein said drive distributing case, said right HST and reduction cases and said left HST and reduction cases are fixedly and integrally connected one after another and define a space opened downward for allowing passage of said grass collecting duct therethrough.

2. A lawn mower as defined in claim 1, wherein said body frame is formed of a pair of right and left band-like profile members extending fore and aft, said right and left HST cases being disposed above said band-like profile members, said said right and left reduction cases being disposed outwardly of said band-like profile members, respectively.

3. A lawn mower as defined in claim 2, wherein said right and left reduction cases are fixed to an outer surface of said respective band-like profile members.

4. A lawn mower as defined in claim 1, wherein said engine is disposed level with or in a higher position than said right and left HSTs.

5. A lawn mower as defined in claim 1, wherein said grass collecting duct extends such that the center of a duct section substantially corresponds to said right axle of said right rear wheel and said left axle of said left rear wheel.

6. A lawn mower as defined in claim 1, wherein said engine has its output shaft extending therefrom fore and aft, said right and left HST cases being disposed at a lower level than said engine output shaft, and wherein said body frame is formed of a pair of right and left band-like profile members extending fore and aft and below said right and left HST cases, respectively.

7. A lawn mower as defined in claim 1, further comprising:

a brake pedal disposed at a forward position of said lawn mower; and right and left wet type brakes interlocked to said brake pedal for braking respective output shafts of said right and left HSTs, said right and left brakes being disposed inwardly of said right and left HSTs, respectively, in the transverse direction.

* * * * *

UNITED STATES PATENT AND TRADEMARK OFFICE
CERTIFICATE OF CORRECTION

PATENT NO. : 6,820,403 B2
DATED : November 23, 2004
INVENTOR(S) : Umemoto

It is certified that error appears in the above-identified patent and that said Letters Patent is hereby corrected as shown below:

<u>Title page, Item [54] and Column 1, line 1,</u>
Title, "LAWN MOWER REAR DRIVE" should read -- LAWN MOWER --

<u>Column 5,</u>
Line 49, "to a right and left in the transverse direction" should read -- right and left in the transverse direction --

<u>Column 6,</u>
Line 28, "said said right and left" should read -- said right and left --

Signed and Sealed this

Second Day of August, 2005

JON W. DUDAS
*Director of the United States Patent and Trademark Office*